United States Patent
Sajassi et al.

(10) Patent No.: US 9,225,642 B2
(45) Date of Patent: *Dec. 29, 2015

(54) LOOP MITIGATION MECHANISM FOR ETHERNET NETWORKS

(71) Applicant: Cisco Technology, Inc., San Jose, CA (US)

(72) Inventors: Ali Sajassi, San Ramon, CA (US); Norman Finn, Livermore, CA (US); Francois Tallet, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,636

(22) Filed: Feb. 20, 2014

(65) Prior Publication Data

US 2014/0169376 A1 Jun. 19, 2014

Related U.S. Application Data

(63) Continuation of application No. 12/146,345, filed on Jun. 25, 2008, now Pat. No. 8,681,641.

(51) Int. Cl.
*H04L 12/741* (2013.01)
*H04L 12/46* (2006.01)
*H04L 12/705* (2013.01)
*H04L 1/00* (2006.01)

(52) U.S. Cl.
CPC ............... *H04L 45/745* (2013.01); *H04L 1/00* (2013.01); *H04L 12/462* (2013.01); *H04L 12/4641* (2013.01); *H04L 45/18* (2013.01)

(58) Field of Classification Search
CPC ............. H04L 12/462; H04L 12/4641; H04L 12/5689; H04L 12/5696; H04L 45/00; H04L 49/354; H04L 49/3018; H04L 49/3027; H04L 45/18; H04L 45/745
USPC ............. 370/389, 393, 397, 399, 395.53, 409
See application file for complete search history.

(56) References Cited

U.S. PATENT DOCUMENTS 6,775,290 B1 * 8/2004 Merchant et al. ......... 370/395.53
2004/0054655 A1 * 3/2004 Brown .......................... 707/1

OTHER PUBLICATIONS

Sajassi, Ali, "802.1 aq: Link State Protocol & Loop Mitigation Options," Cisco, IEEE 802.1—Geneva, May 30, 2007, pp. 53.*

* cited by examiner

*Primary Examiner* — Un C Cho
*Assistant Examiner* — Jeremy Costin

(57) ABSTRACT

A technique is provided for mitigating loops in Ethernet networks. A first port in an Ethernet device receives an Ethernet frame. The frame includes a source identifier, a destination identifier, and a Virtual Local Area Network Identifier (VLAN ID). According to various embodiments, the VLAN ID (VID) has the encoding of both a community group as well as a source bridge ID. A VID database is accessed using the destination identifier and the VID to determine whether the first port has ingress enabled. A filtering database is accessed to determine an egress port for forwarding the Ethernet frame.

14 Claims, 6 Drawing Sheets

Filtering Database 301

| Virtual Local Area Network Identifier And MAC Address 311 | Forwarding Ports 313 |
|---|---|
| 1 08:00:69:02:01:FC | 2, 4, 7 |
| 2 10:10:38:01:F1:AC | 3, 5 |
| 3 11:D1:0C:00:10:28 | 1 |

Figure 3

| Virtual Local Area Network Identifier Database Per Port 401 | | |
|---|---|---|
| VID # 403 | Ingress Enabled 405 | Egress Enabled 407 |
| 1 | 1 | 0 |
| 2 | 0 | 1 |
| 3 | 0 | 1 |
| 4 | 0 | 1 |
| 5 | 1 | 1 |
| 6 | 1 | 0 |
| 7 | 0 | 0 |
| 8 | 0 | 1 |
| 9 | 1 | 0 |

Figure 4

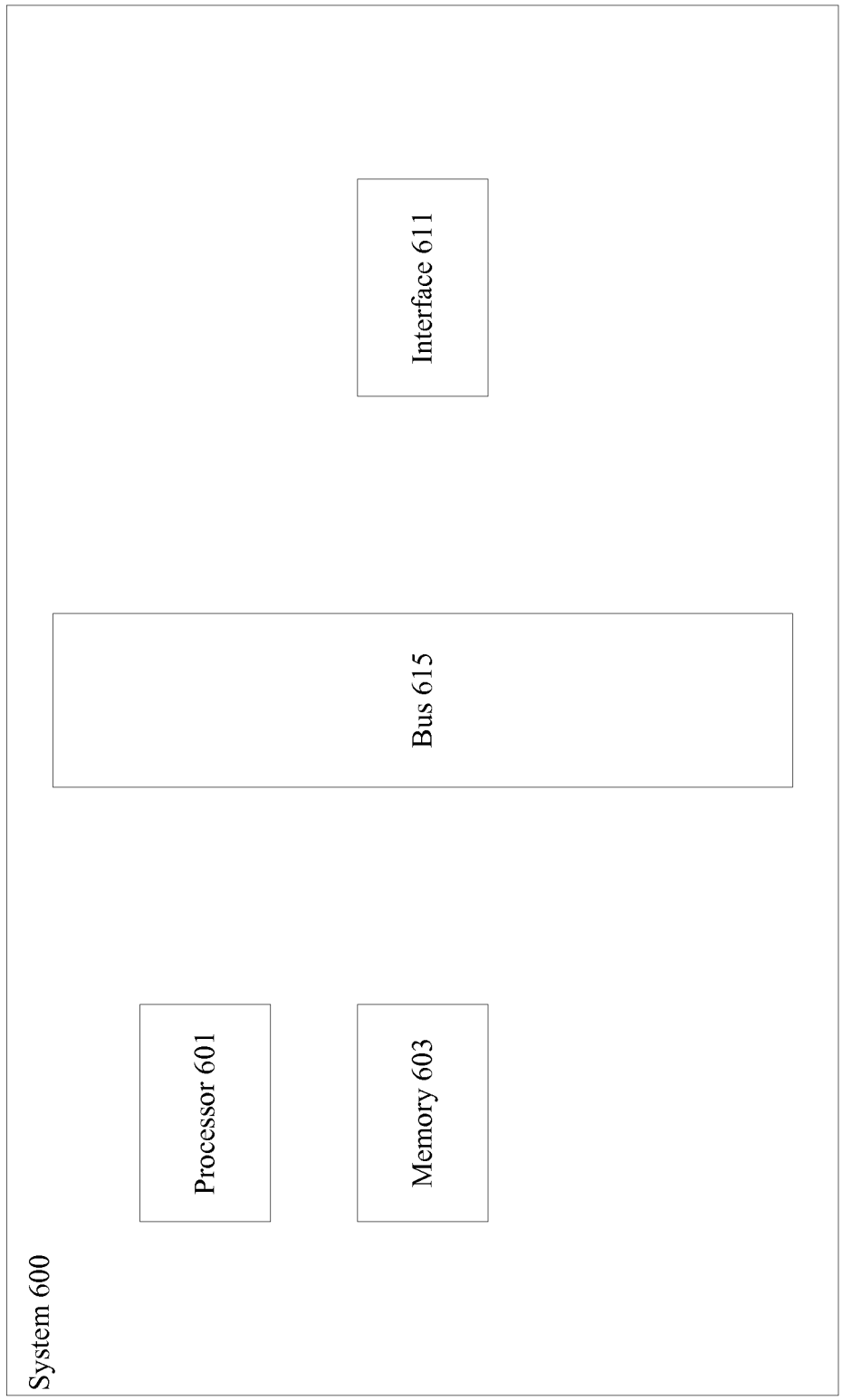

LOOP MITIGATION MECHANISM FOR ETHERNET NETWORKS

RELATED APPLICATIONS

This application is a continuation of U.S. patent application Ser. No. 12/146,345, filed on Jun. 25, 2008, which claims priority to Provisional Patent Application 60/946,129, filed on Jun. 25, 2007. The entirety of U.S. Provisional Patent Application No. 60/946,129 and U.S. patent application Ser. No. 12/146,345 are incorporated by reference herein.

TECHNICAL FIELD

The present disclosure relates to loop mitigation in Ethernet Networks.

BACKGROUND

Various loops such as transient loops or steady state loops sometimes form in Ethernet Networks because of various circumstances. Transient loops and steady state loops can lead to dropped frames, wasted network resources, and other system inefficiencies. Some mechanisms have been developed for mitigating transient loops. However, the mechanisms remain limited.

Consequently, it is desirable to provide improved methods and apparatus for mitigating loops in Ethernet Networks.

BRIEF DESCRIPTION OF THE DRAWINGS

The disclosure may best be understood by reference to the following description taken in conjunction with the accompanying drawings, which illustrate particular example embodiments.

FIG. 3 illustrates a particular example of a filtering database.

FIG. 4 illustrates a particular example of a Virtual Local Area Network identifier (VID) table.

FIG. 6 illustrates a particular example of a network device.

DESCRIPTION

Figure 1:
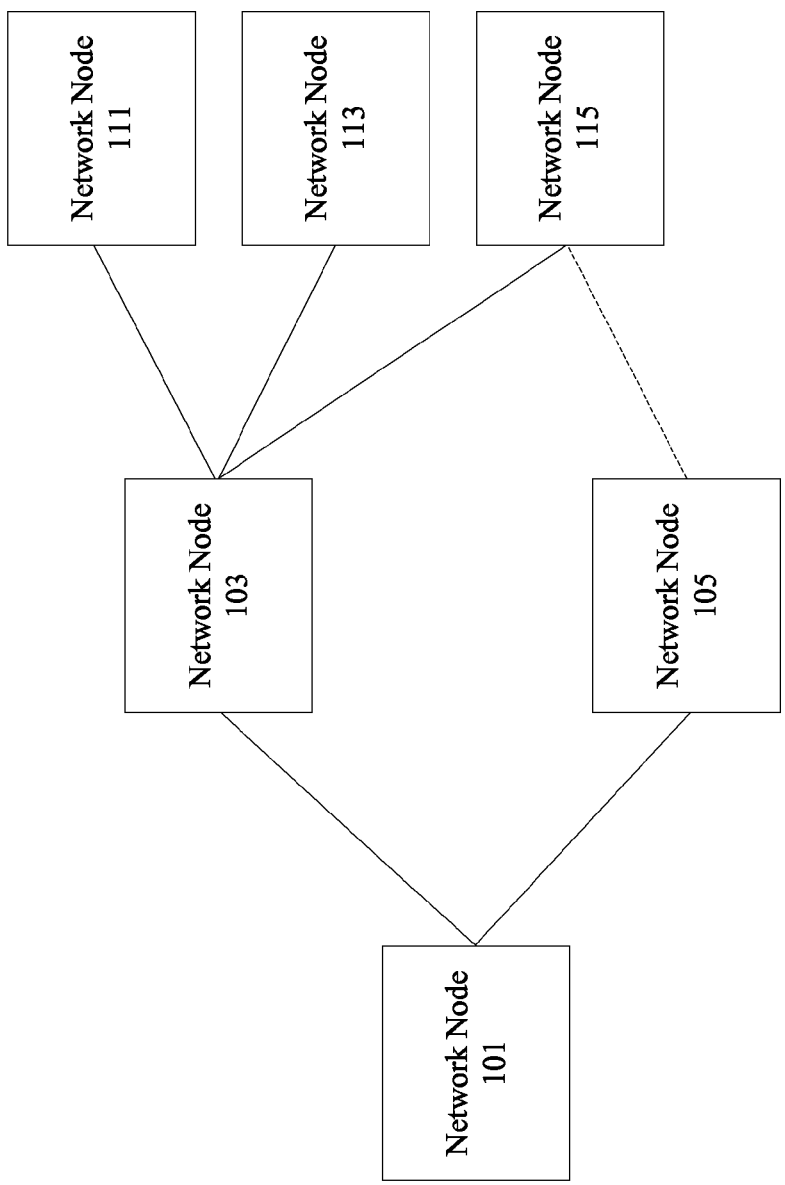
FIG. 1 illustrates a particular example of an Ethernet Network.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Ethernet networks, particular frames and data structures. However, it should be noted that the techniques of the present invention apply to variations to Ethernet networks and a variety of frames and data structures. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

OVERVIEW

A technique is provided for mitigating loops in Ethernet networks. A first port in an Ethernet device receives an Ethernet frame. The frame includes a source identifier, a destination identifier, and a Virtual Local Area Network Identifier (VLAN ID). According to various embodiments, the VLAN ID (VID) has the encoding of both a community group as well as a source bridge ID. A VID database is accessed using the destination identifier and the VID to determine whether the first port has ingress enabled. A filtering database is accessed to determine an egress port for forwarding the Ethernet frame.

According to various embodiments, performing an ingress check for the VID against the input interface not only performs a traditional VLAN check (also known as Color Blocking Logic check), but also performs an Ingress Interface Check (also known as Reverse Path Forwarding—RPF check). In particular embodiments, the VID not only identifies the color of the traffic as done traditionally (e.g., community group), but also it identifies the source bridge.

Example Embodiments

Reverse path forwarding (RPF) is a fundamental concept in multicast routing that allows routers to correctly forward multicast traffic down the distribution tree. RPF makes use of the existing unicast routing table to determine the upstream and downstream neighbors. A router forwards a multicast packet only if it is received on the upstream interface. This RPF check helps to guarantee that the distribution tree will be free of transient loop (at least in case of single-link failure scenarios).

When a multicast packet arrives at a router, the router performs an ingress check (also known as RPF check) on the packet. If the RPF check is successful, the packet is forwarded. Otherwise, it is dropped. For traffic flowing down a source tree, the RPF check procedure works as follows:

Step 1: Router looks up the source address in the unicast routing table to determine whether it has arrived on the interface that is on the reverse path back to the source.

Step 2: If packet has arrived on the interface leading back to the source, the RPF check is successful and the packet is forwarded.

Step 3: If the RPF check in Step 2 fails, the packet is dropped.

Applying RPF check to source media access control (MAC) addresses in a bridged network requires the bridge to perform two lookups for each frame. One lookup is performed to obtain a source MAC address for the RPF check and one lookup is performed to obtain a destination MAC address to forward the frame. Having to perform two lookups undoes the performance gain achieved by doing MAC learning in control plane. In other words, MAC learning in control plane cuts the number of MAC lookups in half; whereas, this RPF check mechanism increases it by a factor of two resulting in zero performance gain.

The techniques of the present invention recognize that it is much more efficient to perform RPF checks by using VLAN IDs (VIDs) instead of source MAC addresses. Currently, bridges perform both VID and destination MAC lookup in a single lookup. According to various embodiments, the techniques and mechanisms of the present invention efficiently use existing Ethernet lookup mechanisms and Ethernet header structures not available in IP. In particular embodiments, Ethernet operation efficiency is improved.

According to particular example embodiments, a network device can more efficiently mitigate loops in Ethernet networks. A network device receives an Ethernet frame and determines if the frame was received on an appropriate port by performing reverse path forwarding check on that frame. If the frame was received on an inappropriate or undesignated port, a loop may exist in the network and the frame is dropped. The network device uses header information to determine the appropriate port or legitimate port on which the frame should have been received. According to various embodiments, the network device determines the information by performing a lookup using a destination media access control (MAC) address and a virtual local area network identifier (VID).

For reverse path forwarding check, 802.1Q ingress filtering capabilities currently specify that each port may support an enable ingress filtering parameter. A frame received on a port that is not in the member set (8.8.9) associated with the VID shall be discarded if this parameter is set. The default value for this parameter is reset, i.e., disable ingress filtering, for all ports. 802.1Q clause 8.8.7 describes active virtual local area network (VLAN) as: A VLAN is active if either of the following is true:

The VLAN's member set (8.8.9) includes one port that is in a forwarding state, and at least one other port of the bridge that is both in a forwarding state and has ingress filtering (8.6.2) disabled. The VLAN's member set includes two or more ports that are in a forwarding state. For ingress filtering and reverse path forwarding (RPF) checks, the ingress filtering feature can be used to perform PRFC on a VLAN basis—e.g., a given bridge along the path of Shortest Path Tree (SPT) has one ingress port and one or more egress ports. If ingress filtering is enabled on all ports except the ingress port for a given SPVID, then only frames with that SPVID can come through the ingress port. And if frames with that SPVIDSs come through any other ports, they get discarded.

This ingress filtering function provides an RPF Check. For ingress filtering and RPF check. Each port may support an enable ingress filtering parameter. A frame received on a port that is not in the member set (8.8.9) associated with the VID shall be discarded if this parameter is set. The default value for this parameter is reset, i.e., disable ingress filtering, for all ports.

Currently there is only one bit that indicates whether a port is in a VLAN member set or not. If this bit is set and ingress filtering is disabled, then frames can come and leave this port. If this bit is not set and ingress filtering is enabled, then frames cannot come and leave this port.

According to various embodiments, two bits per port are provided to indicate the allowed direction for the frames. One bit for the ingress direction and another bit for egress direction. If both bits are set and ingress filtering is enabled, then frames can come and leave this port.

If an ingress bit is not set but an egress bit is set, then frames can leave this port but can not come in through this port, which is what we need for a leaf port of a uni-directional tree. If both ingress and egress bits are not set, then frames can not enter from or leave through this port.

According to various embodiments, if ingress bit is not set but egress bit is set, then frames can leave this port but can not come through this port, which is what we need for a leave port of a uni-directional tree. If both ingress and egress bits are not set, then frames can not come and leave this port. If ingress bit is set but egress bit is not set, then frames can come through this port but not leave this port—which is what is needed for a root port of a uni-directional root tree. In particular embodiments, 2-bit vectors are used in the following manner: 00—no traffic is allowed in either direction, 01—ingress is not allowed but egress is allowed, 10—ingress is allowed but egress is not allowed, 11—ingress and egress are both allowed.

FIG. 1 illustrates a particular example of an Ethernet Network. The Ethernet Network includes network nodes 101, 103, 105, 111, 113, and 115. According to various embodiments, network node 101 is a bridge connecting two subnetworks. In particular embodiments, a loop may form with nodes 101, 103, 105, and 115 because of network topology changes or other factors. Consequently, the techniques of the present invention provide mechanisms for preventing forwarding of data in loop configurations. According to various embodiments, multiple bits are used to indicate whether frames can enter or leave through a particular port. In particular embodiments, frames may be allowed in a particular port, but may not be allowed to leave.

Figure 2:
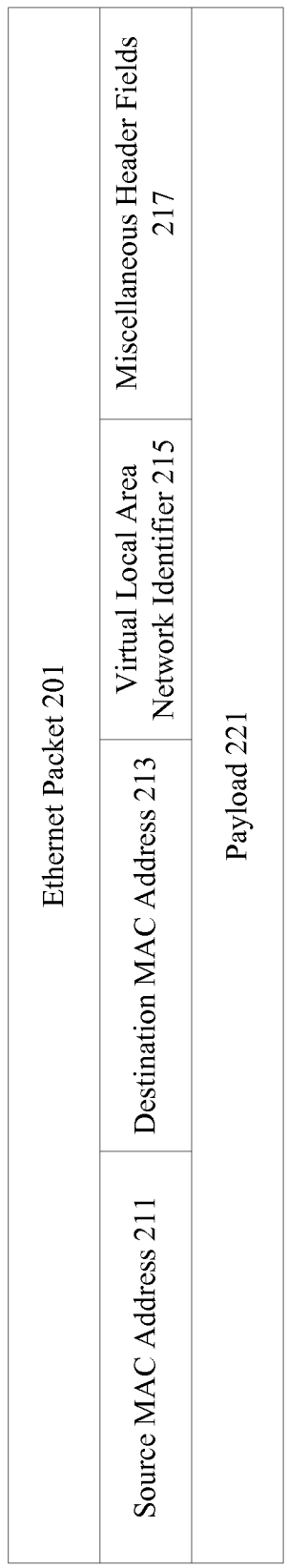
FIG. 2 illustrates a particular example of a frame for transmission in the Ethernet network.

FIG. 2 illustrates a particular example of a frame for transmission in the Ethernet network. According to various embodiments, the frame 201 includes a source MAC address 211, a destination MAC address 213, a virtual local area network (VLAN) identifier 215, and miscellaneous headers 217. The frame 201 also includes a payload 221. According to various embodiments, network devices include hardware capable of obtaining a destination MAC address and a VLAN identifier (VID) in a single lookup.

It should be noted that a variety of fields may be included in a packet for transmission in an Ethernet network. For example, a MAC header may include not only a source MAC address and a destination MAC address, but also an Ether type. Other variations may include a logical link control header. The payload 221 and the header may have their integrity verified using a CRC checksum. Various other flags, fields, and tags may be included in a number of Ethernet packet variations.

FIG. 3 illustrates a particular example of a filtering database. According to various embodiments, the filtering database maintains information on allowed forwarding ports. In other embodiments, a filtering database maintains information on unallowed ports. According to various embodiments, a filtering database 301 includes a virtual local area network identifier (VLAN ID or VID) and MAC address field 311 that can be accessed using a single lookup. Instead of having to perform a lookup using one field and subsequently another field, such as a source MAC address and a destination MAC address, a single lookup can be performed. In particular embodiments, the filtering database 301 maintains a VLAN ID and destination MAC address field. According to various embodiments, unicast MAC addresses correspond to a single port and multicast MAC addresses correspond to several ports. Sample values of VLAN IDs may include any type of value such as 1, 2, or 3 as shown in the filtering database 301. MAC addresses may include hexadecimal values such as 08:00:69:02:01:FC, 10:10:38:01:F1:AC, and 11:D1:0C:00: 10:28 as shown in filtering database 301.

According to various embodiments, the single lookup based on VLAN ID and MAC address allows a device to obtain one or more allowed forwarding ports. In particular embodiments, a single port is provided for VLAN ID and unicast MAC address pair while multiple ports are provided for VLAN ID and multicast MAC address pairs. For example, a VLAN ID and multicast MAC address pair of 1 and 08:00: 69:02:01:FC would return allowed ports 2, 4, and 7. A VLAN ID and multicast MAC address pair lookup of 2 and 10:10: 38:01:F1:AC would return allowed ports 3 and 5. A VLAN ID and unicast MAC address pair lookup of 3 and 11:D1:0C:00: 10:28 would return allowed port 1.

FIG. 4 illustrates a particular example of a virtual local area network identifier (VID) table. According to various embodiments, a virtual local area network identifier (VID) table is used to identify whether ingress and/or egress capability is allowed for a particular port. According to various embodiments, a virtual local area network identifier (VID) per port table 401 includes a VID field 403 and ingress enabled 405 and egress enabled 407 bits. It should be noted that although ingress enabled 405 and egress enabled 407 fields are implemented as bits, there are alternative implements that may implement ingress enabled 405 and egress enabled 407 fields using other mechanisms. In particular embodiments, a port for a particular VID may support ingress enabled and egress enabled, ingress enabled and egress disabled, ingress disabled and egress enabled, and ingress disabled and egress disabled. The ingress check for a received frame along with the egress check for the transmission of that frame, is determined by performing a single lookup for the MAC address VID pair.

According to various embodiments, a port assigns ingress enabled and egress enabled for frames having VID 5, ingress enabled and egress disabled for frames having VID 1, 6, and 9, ingress disabled and egress enabled for frames having VID 2, 3, 4, and 8, and ingress disabled and egress disabled for frames having VID 7.

Figure 5:
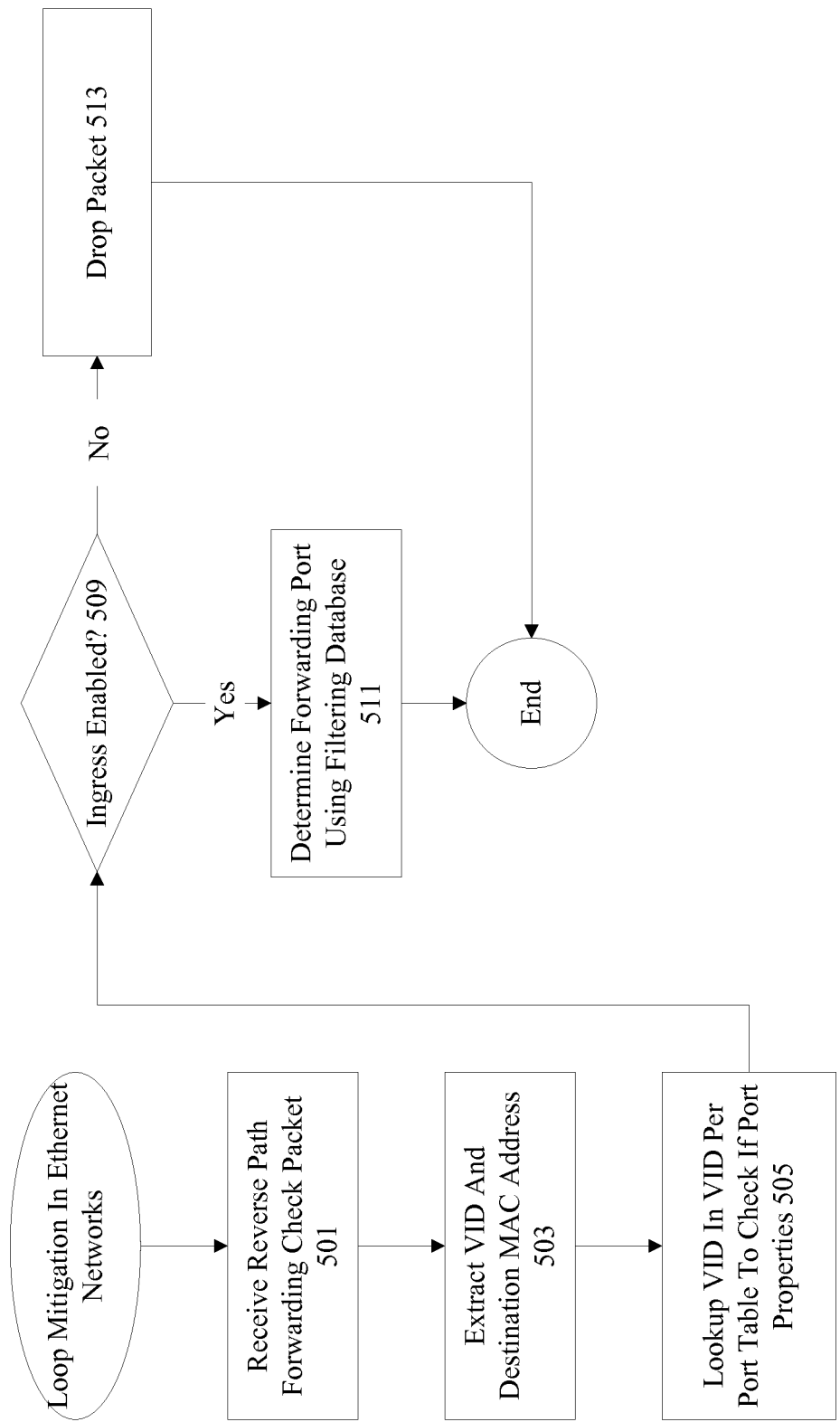
FIG. 5 illustrates a particular example mitigating loops in Ethernet Networks.

FIG. 5 illustrates a particular example of a technique for mitigating loops in Ethernet Networks. At 501, a network device such as a router or a switch receives a reverse path forwarding check frame. Any Ethernet frame that uses ingress port and egress port validation is referred to herein as a reverse path forwarding check frame. In particular embodiments, the reverse path forwarding check frame is a standard or conventional Ethernet frame. According to various embodiments, the techniques of the present invention may be applied to a variety of different frames. At 503, the VID and the destination MAC address are extracted. According to various embodiments, the VID and the destination MAC address can be extracted using a single operation in an efficient and effective manner. In particular embodiments, the VID and the destination MAC address are extracted as part of normal forwarding even when loop mitigation checking is not performed. Consequently, the techniques of the present invention benefit from already available VID and MAC address extraction mechanisms and use the mechanism to perform loop mitigation checking.

At 505, the extracted VID is used to access an entry in the VID per port table to determine port properties, such as if ingress at the port is allowed. If ingress at the port is not allowed at 509, the frame is dropped at 513. According to various embodiments, the frame is dropped at 513 to prevent looped transmission of the frame. The loop may be either transient or persistent. If ingress is allowed at 509, a forwarding table is accessed at 511 using the VID and the destination MAC address to determine the appropriate transmit port. According to various embodiments, a VID per port table is accessed to determine if egress at the transmit port is allowed. If egress at the port is not allowed, the frame is also dropped at 513. Otherwise, the frame is forwarded on the transmit port.

FIG. 6 illustrates a particular example of a network device. A variety of devices and applications can use techniques for mitigating loops. FIG. 6 illustrates one example of a device that can use techniques for mitigating loops.

According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as encoding and decoding modulated streams. Various specially configured devices can also be used in place of a processor 601 or in addition to processor 601. The interface 611 is typically configured to send and/or receive data frames or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions. The program instructions may control the operation of an operating system and/or one or more applications, for example. The memory or memories may also be configured to store received frames, bindings, Keep-Alive states, periodicity information for monitored session frames, Flow-Through and/or Flow-Around configurations, etc.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   receiving a reverse path forwarding check frame at a first port of an Ethernet device, the reverse path forwarding check frame including a virtual local area network identifier (VID);
   accessing a VID table using the VID to look up an ingress property of the first port associated with the VID in the VID table, wherein the VID table includes fields having the VID and one or more first properties of the first port, wherein the one or more properties of the first port include an ingress property and an egress property of the first port, wherein the ingress property includes information that indicates whether the reverse path forwarding check frame is allowed to enter through the first port and wherein the egress property includes information that indicates whether the reverse path forwarding check frame is allowed to exit through the first port,
   wherein the VID table includes fields having the VID, further ingress property and further egress property of the second port, wherein the further ingress property includes information that indicates whether the reverse path forwarding check frame is allowed to enter through the second port and wherein the further egress property includes information that indicates whether the reverse path forwarding check frame is allowed to exit through the second port;
   performing an ingress check to determine if the reverse path forwarding check frame is allowed to enter through the first port by evaluating the one or more first properties of the first port, wherein the reverse path forwarding check frame is dropped in response to the ingress property of the first port included in the VID table indicating that the reverse path forwarding check frame is not allowed to enter through the first port, wherein the first port comprises a receive port;
   accessing a filtering database to determine the second port on which to forward the reverse path forwarding check frame in response to evaluating the one or more first properties of the first port; and
   accessing the VID table using the VID to look up the further egress property of the second port associated with the VID in the VID table to determine whether the reverse path forwarding check frame is allowed to exit through the second port,
   wherein the reverse path forwarding check frame is forwarded on the second port in response to the further egress property of the second port included in the VID table indicating that the reverse path forwarding check frame is allowed through the second port, wherein the second port comprises a transmit port.

2. The method of claim 1, wherein the reverse path forwarding check frame also includes a source identifier and a destination identifier, wherein each of the source identifier and the destination identifier includes a respective media access control (MAC) address.

3. The method of claim 1, wherein evaluating the one or more first properties of the first port includes determining that the ingress property of the first port included in the VID table indicating that the reverse path forwarding check frame is allowed to enter through the first port, the filtering database including a field having both the VID and a destination identifier.

4. The method of claim 1, wherein the VID includes an encoding of a source bridge ID.

5. The method of claim 1, wherein the filtering database provides forwarding ports based on VID and destination MAC address pairs.

6. The method of claim 5, wherein the VID and the destination MAC address are extracted using a single operation.

7. The method of claim 1, wherein the reverse path forwarding check frame is a standard Ethernet frame.

8. The method of claim 1, wherein the VID table is a per port table including VID, ingress enabled, and egress enabled fields.

9. The method of claim 8, wherein the VID table is accessed to determine that the second port has egress enabled.

10. The method of claim 1, wherein the VID table stores an ingress property and an egress property of the first port and a further ingress property and a further egress property of the second port using two bits.

11. The method of claim 1, further comprising:
    determining that a further egress property of the second port indicates that the reverse path forwarding check frame is not allowed to exit through the second port; and
    dropping the reverse path forwarding check frame.

12. An apparatus, comprising:
    an interface to receive a reverse path forwarding check Ethernet frame at a first port in an Ethernet device, the reverse path forwarding check Ethernet frame including a virtual local area network identifier (VID);
    a processor;
    a non-transitory memory including instructions that when executed by the processor cause the apparatus to:
    receive a reverse path forwarding check frame at a first port of an Ethernet device, the reverse path forwarding check frame including a virtual local area network identifier (VID);
    access a VID table using the VID to look up an ingress property of the first port associated with the VID in the VID table, wherein the VID table includes fields having the VID and one or more first properties of the first port, wherein the one or more properties of the first port include an ingress property and an egress property of the first port, wherein the ingress property includes information that indicates whether the reverse path forwarding check frame is allowed to enter through the first port and wherein the egress property includes information that indicates whether the reverse path forwarding check frame is allowed to exit through the first port,
    wherein the VID table includes fields having the VID, further ingress property and further egress property of the second port, wherein the further ingress property includes information that indicates whether the reverse path forwarding check frame is allowed to enter through the second port and wherein the further egress property includes information that indicates whether the reverse path forwarding check frame is allowed to exit through the second port;
    perform an ingress check to determine if the reverse path forwarding check frame is allowed to enter through the first port by evaluating the one or more first properties of the first port, wherein the reverse path forwarding check frame is dropped in response to the ingress property of the first port included in the VID table indicating that the reverse path forwarding check frame is not allowed to enter through the first port, wherein the first port comprises a receive port;

access a filtering database to determine the second port on which to forward the reverse path forwarding check frame in response to evaluating the one or more first properties of the first port; and access the VID table using the VID to look up the further egress property of the second port associated with the VID in the VID table to determine whether the reverse path forwarding check frame is allowed to exit through the second port, wherein the reverse path forwarding check frame is forwarded on the second port in response to the further egress property of the second port included in the VID table indicating that the reverse path forwarding check frame is allowed through the second port, wherein the second port comprises a transmit port.

13. The apparatus of claim 12, wherein evaluating the one or more first properties of the first port includes determining that the ingress property of the first port included in the VID table indicating that the reverse path forwarding check frame is allowed to enter through the first port, the filtering database including a field having both the VID and a destination identifier.

14. A non-transitory computer-readable storage medium encoded with computer-executable instructions that when executed by one or more processors of a processing system implement a method comprising:

receiving a reverse path forwarding check frame at a first port of an Ethernet device, the reverse path forwarding check frame including a virtual local area network identifier (VID);

accessing a VID table using the VID to look up an ingress property of the first port associated with the VID in the VID table, wherein the VID table includes fields having the VID and one or more first properties of the first port, wherein the one or more properties of the first port include an ingress property and an egress property of the first port, wherein the ingress property includes information that indicates whether the reverse path forwarding check frame is allowed to enter through the first port and wherein the egress property includes information that indicates whether the reverse path forwarding check frame is allowed to exit through the first port, wherein the VID table includes fields having the VID, further ingress property and further egress property of the second port, wherein the further ingress property includes information that indicates whether the reverse path forwarding check frame is allowed to enter through the second port and wherein the further egress property includes information that indicates whether the reverse path forwarding check frame is allowed to exit through the second port;

performing an ingress check to determine if the reverse path forwarding check frame is allowed to enter through the first port by evaluating the one or more first properties of the first port, wherein the reverse path forwarding check frame is dropped in response to the ingress property of the first port included in the VID table indicating that the reverse path forwarding check frame is not allowed to enter through the first port, wherein the first port comprises a receive port;

accessing a filtering database to determine the second port on which to forward the reverse path forwarding check frame in response to evaluating the one or more first properties of the first port; and accessing the VID table using the VID to look up the further egress property of the second port associated with the VID in the VID table to determine whether the reverse path forwarding check frame is allowed to exit through the second port, wherein the reverse path forwarding check frame is forwarded on the second port in response to the further egress property of the second port included in the VID table indicating that the reverse path forwarding check frame is allowed through the second port, wherein the second port comprises a transmit port.

* * * * *